(12) United States Patent
Hwang et al.

(10) Patent No.: US 10,643,486 B2
(45) Date of Patent: May 5, 2020

(54) METHOD FOR CASE MATCHING BETWEEN TUTOR USER AND TUTEE USER

(71) Applicant: NATIONAL TAIWAN NORMAL UNIVERSITY, Taipei (TW)

(72) Inventors: Ming-Yueh Hwang, Taipei (TW); Jon-Chao Hong, Taipei (TW); Chi-Ruei Tsai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 365 days.

(21) Appl. No.: 15/869,529

(22) Filed: Jan. 12, 2018

(65) Prior Publication Data

US 2019/0066528 A1 Feb. 28, 2019

(30) Foreign Application Priority Data

Aug. 25, 2017 (TW) .............................. 106128878 A

(51) Int. Cl.
| | | |
|---|---|---|
| *G09B 5/00* | (2006.01) | |
| *G09B 5/14* | (2006.01) | |
| *G06Q 50/20* | (2012.01) | |
| *G06Q 10/06* | (2012.01) | |
| *H04W 4/029* | (2018.01) | |

(52) U.S. Cl.
CPC ....... *G09B 5/14* (2013.01); *G06Q 10/063112* (2013.01); *G06Q 50/20* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 5,437,555 | A * | 8/1995 | Ziv-El | G09B 5/14 379/102.02 |
| 6,988,138 | B1 * | 1/2006 | Alcorn | G09B 5/02 434/350 |
| 2004/0009461 | A1 * | 1/2004 | Snyder | G06Q 10/06311 434/350 |

(Continued)

FOREIGN PATENT DOCUMENTS

| | | |
|---|---|---|
| TW | M533793 U | 12/2016 |
| TW | M541078 U | 5/2017 |

OTHER PUBLICATIONS

Taiwanese Search Report for Taiwanese Application No. 106128878, dated May 8, 2018, with English translation.

*Primary Examiner* — Paul A D'Agostino
(74) *Attorney, Agent, or Firm* — Birch, Stewart, Kolsach & Birch, LLP

(57) ABSTRACT

Steps of a method of case matching for a tutor user are implemented by a server that stores a plurality of tutee cases each including a lecturing location and a subject demand, and a tutor user registration corresponding to the tutor user and including a tutor location, a lecturing subject and a commuting distance limit. The server determines whether the tutee cases include a target tutee case of which the subject demand matches the lecturing subject and a commuting distance between the lecturing location of which and the tutor location is not greater than the commuting distance limit. When the determination is affirmative, the server generates a filtered case result indicating the target tutee case.

9 Claims, 2 Drawing Sheets

(56) References Cited

U.S. PATENT DOCUMENTS

| | | | | |
|---|---|---|---|---|
| 2006/0228689 | A1* | 10/2006 | Rajaram | G09B 5/14 |
| | | | | 434/350 |
| 2007/0298400 | A1* | 12/2007 | Alabi | G09B 7/00 |
| | | | | 434/350 |
| 2011/0066998 | A1* | 3/2011 | Scandura | G06N 5/022 |
| | | | | 717/100 |
| 2012/0028230 | A1* | 2/2012 | Devereux | G09B 19/00 |
| | | | | 434/236 |
| 2014/0322692 | A1* | 10/2014 | Fieldman | G09B 7/00 |
| | | | | 434/322 |
| 2015/0066559 | A1* | 3/2015 | Brouwer | G06Q 50/2053 |
| | | | | 705/7.21 |

* cited by examiner

METHOD FOR CASE MATCHING BETWEEN TUTOR USER AND TUTEE USER

CROSS-REFERENCE TO RELATED APPLICATION

This application claims priority to Taiwanese Patent Application No. 106128878 filed on Aug. 25, 2017.

FIELD

The disclosure relates to a method for case matching between a tutor user and a tutee user.

BACKGROUND

Tutoring is a common occupation where a tutor provides private lessons to a tutee. It is troublesome for tutors and tutees to find suitable tutoring cases with acceptable wages, commuting distances, etc.

SUMMARY

Therefore, an object of the present disclosure is to provide a method for case matching for a tutor user or a tutee user that takes a commuting distance into account.

According to one aspect of the present disclosure, a method of case matching for a tutor user includes:

providing a server that stores map information, a plurality of tutee cases, and a tutor user registration, each of the tutee cases including a lecturing location and a subject demand, the tutor user registration corresponding to the tutor user and including a tutor location, a lecturing subject and a commuting distance limit;

receiving, by the server from a tutor-side electronic device, a tutor request that corresponds to the tutor user registration for filtering the tutee cases;

upon receipt of the tutor request, calculating, by the server for each of at least a portion of the tutee cases, a commuting distance between the lecturing location thereof and the tutor location with reference to the map information;

determining, by the server, whether the tutee cases include a target tutee case that is one of the tutee cases whose subject demand matches the lecturing subject, and the commuting distance calculated for which is not greater than the commuting distance limit; and when the determination made above is affirmative, generating, by the server, a filtered case result that indicates the target tutee case, and transmitting, by the server, the filtered case result to the tutor-side electronic device.

According to another aspect of this disclosure, a method for tutor matching for a tutee user includes:

providing a server that stores map information, and a plurality of tutor user registrations, each of the tutor user registrations including a tutor location, a lecturing subject and a commuting distance limit;

receiving, by the server, a tutee case that includes a lecturing location and a subject demand from a tutee-side electronic device corresponding, to the tutee user;

receiving, by the server from the tutee-side electronic device, a tutee request that corresponds to the tutee case for filtering the tutor user registrations;

upon receipt of the tutee request, calculating, by the server for each of at least a portion of the tutor user registrations, a commuting distance between the lecturing location and the tutor location thereof with reference to the map information;

determining whether the tutor user registrations include a target tutor user registration that is one of the tutor user registrations whose lecturing subject matches the subject demand, and the commuting distance calculated for which is not greater than the commuting distance limit; and when the determination made above is affirmative, generating, by the server, a filtered tutor user registration result that indicates the target tutor user registration, and transmitting, by the server, the filtered tutor user registration result to the tutee-side electronic device.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
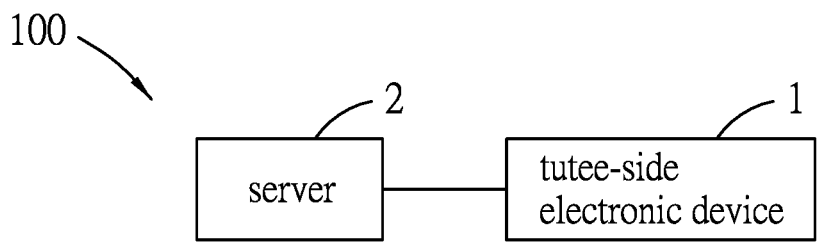
FIG. 1 is a schematic block diagram of a tutee-side electronic device and a server for implementing a method of tutor matching for a tutee user according to one embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
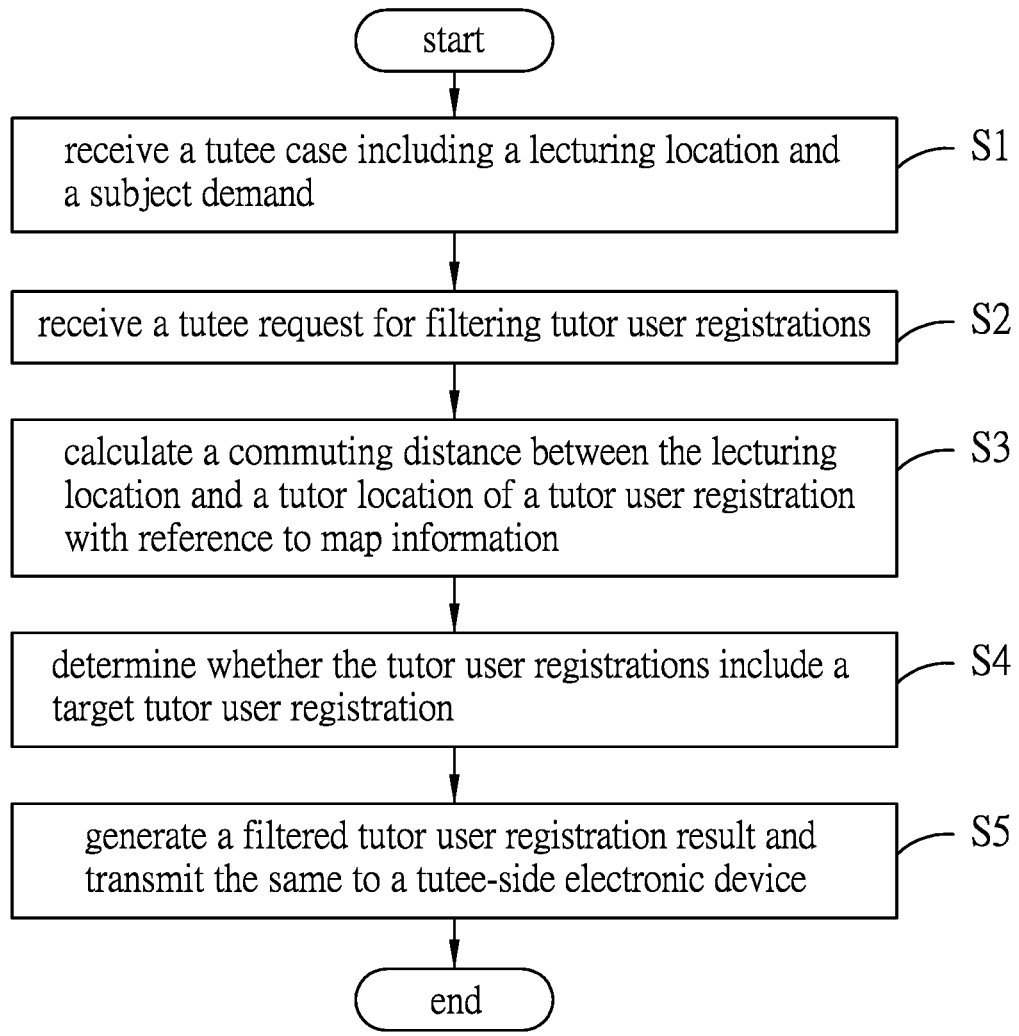
FIG. 2 illustrates a flow chart of the method of tutor matching shown in FIG. 1.

Referring to FIGS. 1 and 2, a method of tutor matching for a tutee user according to an embodiment of the present disclosure is shown. The method is to be implemented by a server 2 communicating with a tutee-side electronic device 1 via a communication network. The tutee-side electronic device 1 is operated by a tutee user or the parents of the tutee user, and can be implemented by a smartphone, a tablet computer, a desktop computer, a laptop computer or the like, and the present disclosure is not limited in this respect.

In this embodiment, the server 2 is stores map information, a plurality of tutor user registrations and a plurality of rating scores corresponding respectively to the tutor user registrations stored therein. The map information may contain data related to road maps of a city, a state, or a country. Each of the tutor user registrations includes a tutor location, a lecturing subject and a commuting distance limit and corresponds to a tutor user. The lecturing subject is a subject of study for which the corresponding tutor user offers a lesson, and can be, e.g., junior high school math or senior high school English. The tutor location of each tutor user registration is determined by the corresponding tutor user and can be, e.g., an address of the tutor user The commuting distance limit defines an upper limit of a distance the corresponding tutor user is willing to commute or travel for a hired tutoring session. The commuting distance limit of each tutor user registration can be set by the corresponding tutor user and is for example five kilometers. The rating score may be an average of ratings given by tutees that the tutor user has taught in the past regarding quality of teaching. For example, the rating scores may range from one point to five points, where five points represent the highest rating, and the disclosure is not limited in this respect.

In step S1, the server 2 receives a tutee case that includes a lecturing location and a subject demand from the tutee-side electronic device 1 corresponding to the tutee user. The lecturing location can be a home address of the tutee user, and the subject demand is a subject of study the tutee user wishes to hire a tutor for, and can be, e.g., junior high school math or senior high school English, but the disclosure is not limited in this respect.

In step S2, the server 2 receives, from the tutee-side electronic device 1, a tutee request corresponding to the tutee case for filtering the tutor user registrations. After the server 2 receives the tutee request, in step S3, the server 2 calculates, for each of the tutor user registrations, a commuting distance between the lecturing location and the tutor location thereof with reference to the map information. The calculation of the commuting distance based on known addresses (or GPS coordinates or the like) of the lecturing location and the tutor location and a map covering these locations should be well known in the art, and therefore relevant details will not be provided herein for the sake of brevity.

In one embodiment, the server 2 may first find out a portion of the tutor user registrations whose lecturing subject matches the subject demand (e.g., both being junior high school science) in advance of step S3. Subsequently, in step S3, the server 2 calculates, for each tutor user registration whose lecturing subject matches the subject demand, the commuting distance thereof to thereby save computation resources and cost.

In step S4, the server 2 determines whether the tutor user registrations include a target tutor user registration that is one of the tutor user registrations whose lecturing subject matches the subject demand and the commuting distance calculated for which is not greater than the commuting distance limit thereof.

When the determination made in step S4 is affirmative, the flow proceeds to step S1, where the server 2 generates a filtered tutor user registration result that indicates the target tutor user registration, and transmits the same to the tutee-side electronic device 1 to thereby be displayed on the tutee-side electronic device 1. It is noted that more than one target tutor user registration may be determined from among the tutor user registrations, and the filtered tutor user registration result may indicate all of these target tutor user registrations in such a case.

It should be noted that the filtered tutor user registration result may further indicate a commuting expense corresponding to target tutor user registration and an hourly wage corresponding to the target tutor user registration. The commuting expense is calculated by the server 2 with reference to the commuting distance of the target tutor user registration and is positively correlated to the commuting distance of the target tutor user registration. For example, the commuting expense has a basic fare of forty new Taiwanese dollars (NTD); for the first fifteen kilometers, a five-NTD per kilometer rate is charged; and for each kilometer over fifteen kilometers, a ten-NTD per kilometer rate is charged.

The hourly wage for the target tutor user registration maybe calculated with reference to the lecturing subject and the corresponding rating score, and positively correlated to the rating score. For example, basic hourly wages for lecturing subjects of junior high school math and senior high school English may respectively be 11.5 U.S. dollars and 16 U.S. dollars per hour. Each rating score is converted into a rating parameter serving as a weight for calculating the hourly wage. For example, the rating parameter can be set as 1.1 in correspondence to a rating score not lower than 4.5 points, and can be set as 1 in correspondence to a rating score lower than 4.5 points. In this embodiment, the hourly wage for the target tutor user registration is calculated by multiplying the basic hourly wage of the lecturing subject by the rating parameter of the corresponding rating score. Via the filtered tutor user registration result, the tutee user or the parents of the tutee user can decide whether the commuting expense and the hourly wage corresponding to the target tutor user registration are acceptable. After receipt of the filtered tutor user registration result, the tutee-side electronic device 1 can be operated by the tutee user to transmit an invitation corresponding to the target tutor user registration to the server 2 if the tutee user wishes to hire the tutor user corresponding to the target tutor user registration. The server 2 receives the invitation and transmits the same to a tutor-side electronic device that corresponds to the target tutor user registration. After receipt of the invitation, the tutor-side electronic device can be operated to respond to the invitation.

Figure 3:
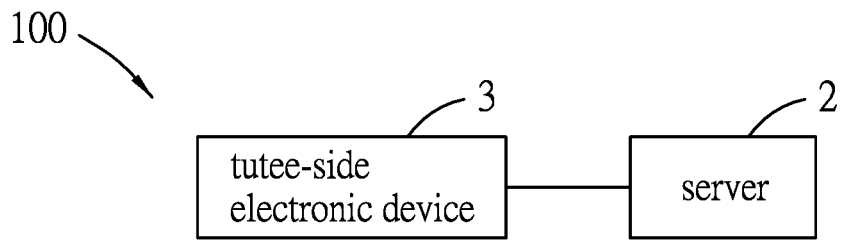
FIG. 3 is a schematic block diagram of a tutor-side electronic device and a server for implementing a method of case matching for a tutor user according to another embodiment of the present disclosure.
Figure 4:
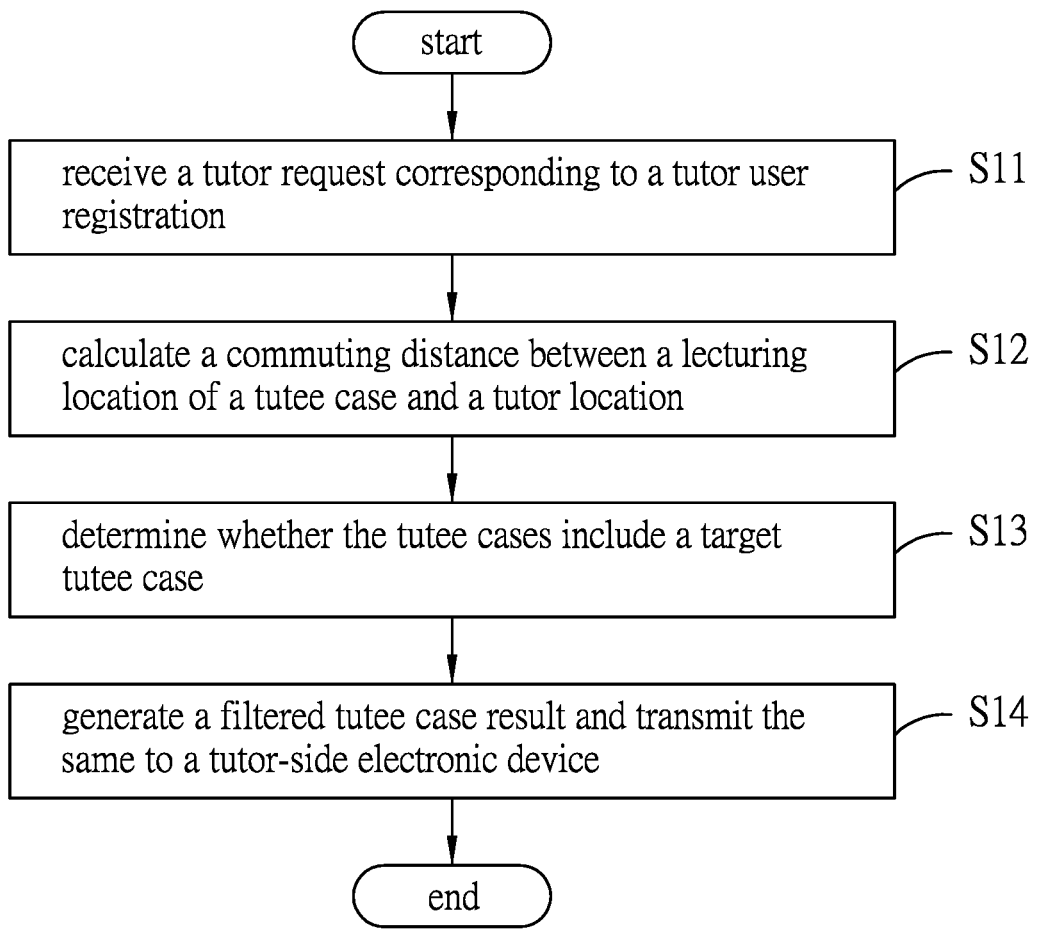
FIG. 4 is a flow chart illustrating the method of case matching shown in FIG. 3.

Referring to FIGS. 3 and 4, a method of tutor matching for a tutor user according to another embodiment of the present disclosure is provided. The method is implemented by the server 2 communicating with a tutor-side electronic device 3 via a communication network. The server 2 stores map information, which can be the same map information provided in the embodiment of FIGS. 1 and 2, a plurality of tutee cases, a tutor user registration corresponding to the tutor user, and a rating score corresponding to the tutor user registration stored therein. Each of the tutee cases includes a lecturing location and a subject demand. The tutor user registration includes a tutor location, a lecturing subject and a commuting distance limit.

The tutor-side electronic device 3 is operated by the tutor user and can be implemented by a smartphone, a tablet computer, a desktop computer, a laptop computer or the like, and the present disclosure is not limited in this respect.

In step S11, the server 2 receives, from the tutor-side electronic device 3, a tutor request that corresponds to the tutor user registration for filtering the tutee cases.

Upon receipt of the tutor request, in step S12, the server 2 calculates, for each of the tutee cases, a commuting distance between the lecturing location thereof and the tutor location with reference to the map information. The calculation of the commuting distance based on known addresses or GPS coordinates of the lecturing location and the tutor location and a map covering these locations should be well known in the art, and therefore relevant details will not be provided herein for the sake of brevity.

In step S13, the server 2 determines whether the tutee cases include a target tutee case that is one of the tutee cases whose subject demand matches the lecturing subject, and the commuting distance calculated for which is not greater than the commuting distance limit.

Similar to the embodiment illustrated in FIGS. 1 and 2, the server 2 may first find out a portion of the tutee cases whose subject demand matches the lecturing subject in advance of step S12. After that, in step S12, the server 2 only calculates, for each tutee case whose subject demand matches the lecturing subject, the commuting distance thereof to thereby reduce computation cost.

When the determination made in step S13 is affirmative, the flow proceeds to step S14, in which the server 2 generates a filtered case result that indicates the target tutee case and transmits the same to the tutor-side electronic device 3 to thereby be displayed on the tutor-side electronic device 3. By this way, any tutee case with a commuting distance with respect to the tutor location being greater than the commuting distance limit is excluded from the filtered case result. It is noted that more than one target tutee case may be determined from among the tutee cases, and the filtered case result may indicate all of these target tutee cases in such condition.

Similar to the embodiment depicted in FIGS. 1 and 2, the filtered case result may further indicate a commuting expense corresponding to the target tutee case and an hourly wage corresponding to the target tutee case. The commuting expense is calculated with reference to the commuting distance of the target tutee case, and is positively correlated to the commuting distance of the target tutee case.

The hourly wage may be calculated with reference to the lecturing subject and the rating score corresponding to the tutor user registration, and positively correlated to the rating score. The method of calculating the hourly wage may be the same as that of the embodiment shown in FIGS. 1 and 2 and details thereof are thus omitted in this embodiment.

After receipt of the filtered case result, the tutor-side electronic device 3 can be operated by the tutor user to transmit an invitation corresponding to the target tutee case to the server 2 if the tutor user wishes to be hired for the target tutee case. The server 2 receives the invitation and transmits the same to a tutee-side electronic device that corresponds to the target tutee case. After receipt of the invitation, the tutee-side electronic device can be operated to respond to the invitation. As a result, both the invitation and the response for the invitation can be completed online.

In one embodiment, the server 2 further stores a plurality of certification image templates, including, for example, a template of a teacher registration certificate, a template of a teaching license, a template of a teacher credential, a template of a professional certification of general educations, a template of a professional certification of mathematics, a university diploma, a graduate diploma, etc. The server 2 receives a certificate image from the tutor-side electronic device 3 and then determines whether the certificate image conforms with one of the certification image templates. The certificate image is an image of a certification, such as a teacher registration certificate. When the determination made above is affirmative, the server 2 incorporates the certificate image into the tutor user registration corresponding to the tutor-side electronic device 3. By this way, the server 2 can ensure authenticity of the certification image received from the tutor-side electronic device 3.

To sum up, by virtue of the methods according to the embodiments of the present disclosure, the server 2 takes the commuting distance limit of a tutor user into account when generating the filtered case result for the tutor user or the filtered tutor user registration result for the tutee user. Further, the filtered case result indicates the hourly wage corresponding to the target tutee case for the tutor user to decide whether such hourly wage is acceptable. Likewise, the filtered tutor user registration result indicates the hourly wage corresponding to the target tutor user registration for the tutee user to decide whether such hourly wage is acceptable.

In the description above, for the purposes of explanation, numerous specific details have been set forth in order to provide a thorough understanding of the embodiment. It will be apparent, however, to one skilled in the art, that one or more other embodiments may be practiced without some of these specific details It should also be appreciated that reference throughout this specification to "one embodiment," "an embodiment," an embodiment with an indication of an ordinal number and so forth means that a particular feature, structure, or characteristic may be included in the practice of the disclosure It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of case matching for a tutor user, comprising:
providing a server that stores map information, a plurality of tutee cases, and a tutor user registration, each of the tutee cases including a lecturing location, and a subject demand, the tutor user registration corresponding to the tutor user and including a tutor location, a lecturing subject and a commuting distance limit;
receiving, by the server from a tutor-side electronic device, a tutor request that corresponds to the tutor user registration for filtering the tutee cases;
upon receipt of the tutor request, calculating, by the server for each of at least a portion of the tutee cases, a commuting distance between the lecturing location thereof and the tutor location with reference to the map information;
determining, by the server, whether the tutee cases include a target tutee case that is one of the tutee cases whose subject demand matches the lecturing subject, and the commuting distance calculated for which is not greater than the commuting distance limit; and
when the determination made above is affirmative, generating, by the server, a filtered case result that indicates the target tutee case, and transmitting, by the server, the filtered case result to the tutor-side electronic device.

2. The method as claimed in claim 1, wherein the filtered case result further indicates a commuting expense corresponding to the target tutee case, and the generating the filtered case result includes calculating, by the server, the commuting expense with reference to the commuting distance calculated for the target tutee case, the commuting expense being positively correlated to the commuting distance calculated for the target tutee case.

3. The method as claimed in claim 1, wherein the filtered case result further indicates an hourly wage corresponding to the target tutee case, and the generating the filtered case result includes calculating, by the server, the hourly wage with reference to the lecturing subject.

4. The method as claimed in claim 3, wherein the server further stores a rating score corresponding to the tutor user registration, and the hourly wage is calculated with further reference to the rating score, the hourly wage being positively correlated to the rating score.

5. The method as claimed in claim 1, wherein the server further stores a plurality of certification image templates, the method further comprising:
receiving, by the server, a certificate image from the tutor-side electronic device;
determining whether the certificate image conforms with one of the certification image templates; and incorporating the certificate image into the tutor user registration when it is determined that the certificate image conforms with one of the certification image templates.

6. A method for tutor matching for a tutee user, comprising:
providing a server that stores map information, and a plurality of tutor user registrations, each of the tutor user registrations including a tutor location, a lecturing subject and a commuting distance limit;
receiving, by the server, a tutee case that includes a lecturing location and a subject demand from a tutee-side electronic device corresponding to the tutee user;
receiving, by the server from the tutee-side electronic device, a tutee request that corresponds to the tutee case for filtering the tutor user registrations;
upon receipt of the tutee request, calculating, by the server for each of at least a portion of the tutor user registrations, a commuting distance between the lecturing location and the tutor location thereof with reference to the map information;
determining, by the server, whether the tutor user registrations include a target tutor user registration that is one of the tutor user registrations whose lecturing subject matches the subject demand, and the commuting distance calculated for which is not greater than the commuting distance limit; and
when the determination made above is affirmative, generating, by the server, a filtered tutor user registration result that indicates the target tutor user registration, and transmitting, by the server, the filtered tutor user registration result to the tutee-side electronic device.

7. The method as claimed in claim 6, wherein the filtered tutor user registration result further indicates a commuting expense corresponding to the target tutor user registration, and the generating the filtered tutor user registration result includes calculating, by the server, the commuting expense with reference to the commuting distance calculated for the target tutor user registration, the commuting expense being positively correlated to the commuting distance calculated for the target tutor user registration.

8. The method as claimed in claim 6, wherein the filtered tutor user registration result further indicates an hourly wage corresponding to the target tutor user registration, and the generating the filtered tutor user registration result includes calculating the hourly wage with reference to the lecturing subject.

9. The method as claimed in claim 8, the server further stores a plurality of rating scores corresponding respectively to the tutor user registrations, wherein the hourly wage is calculated with further reference to one of the rating scores that corresponds to the target tutor user registration, the hourly wage being positively correlated to the one of the rating scores that corresponds to the target tutor user registration.

* * * * *